June 5, 1923.
H. SMITH
AUTOMOBILE TIRE CHAIN
Filed Feb. 13, 1922
1,458,081
2 Sheets-Sheet 1
FIG. 1.
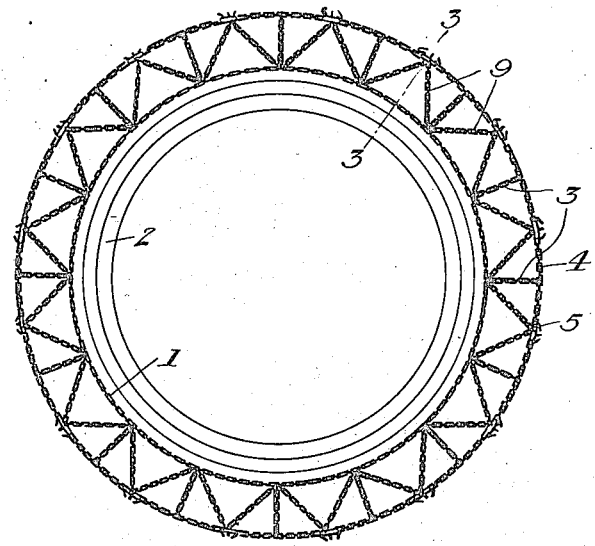
FIG. 2.
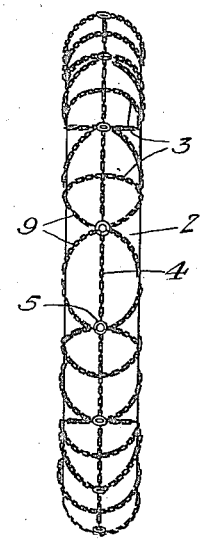
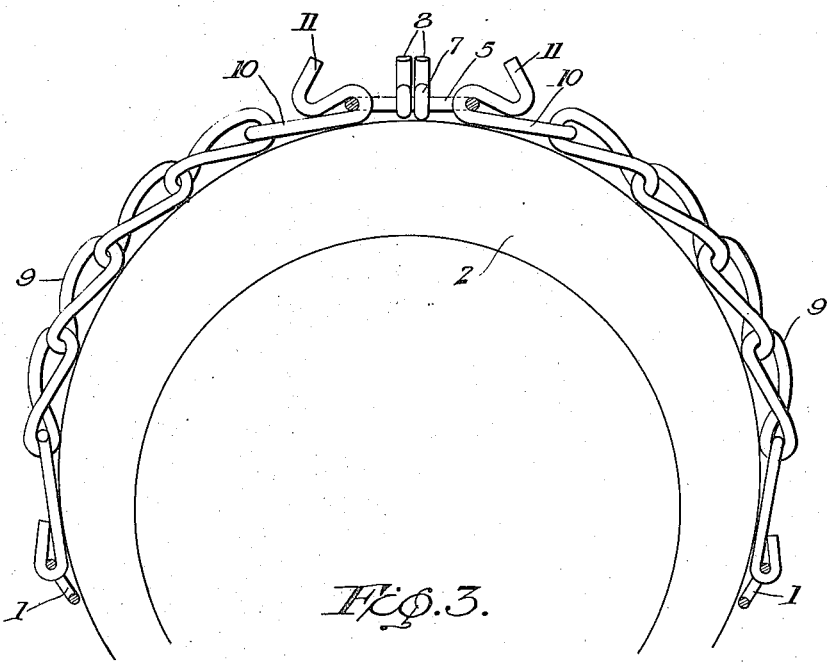
FIG. 3.
Harry Smith,
INVENTOR
BY Victor J. Evans
ATTORNEY
WITNESS:

June 5, 1923.

H. SMITH

AUTOMOBILE TIRE CHAIN

Filed Feb. 13, 1922

Harry Smith, INVENTOR

BY *Victor J. Evans*

ATTORNEY

WITNESS:

Patented June 5, 1923.

1,458,081

UNITED STATES PATENT OFFICE.

HARRY SMITH, OF SCIOTO MILLS, ILLINOIS.

AUTOMOBILE TIRE CHAIN.

Application filed February 13, 1922. Serial No. 536,240.

*To all whom it may concern:*

Be it known that I, HARRY SMITH, a citizen of the United States, residing at Scioto Mills, in the county of Stephenson and State of Illinois, have invented new and useful Improvements in Automobile Tire Chains, of which the following is a specification.

My present invention has reference to an anti-skid chain for automobiles.

My object is to produce an anti-skid chain for pneumatic tired wheels which shall be of a construction to offer a greater traction surface between the wheel and the road than is presented by the ordinary construction of such chains, and also one which will positively prevent the side skid of the machine.

A further object is to produce an anti-skid chain for automobile tires in which the circumferential or side chains may be comparatively light, and in which a central tread chain of a heavier construction is provided, the latter being connected at intervals to ring members to which are also secured the ends of angularly arranged cross chains that have their free ends secured to the side chains, while in addition to this transverse cross chains are arranged between the angle and central longitudinal chain.

A still further object is the production of an anti-skid chain for automobile wheels in which longitudinal, transverse and angularly arranged tread chains are provided, the angle and longitudinal chains being connected by rings and being provided at their connections with the said rings, with outwardly projecting elements in the nature of calks, and whereby a greater wearing surface is provided the chain and also whereby the arrangement of the elements constituting the chain, and the calks positively prevent the lateral or side skidding of the machine.

The foregoing, and other objects which will appear as the nature of the invention is better understood, may be accomplished by a construction, combination and operative arrangement of parts, such as is disclosed by the drawings which accompany and which form part of this application.

In the drawings:—

Figure 1 is a side elevation of a pneumatic tired wheel illustrating the application of the improvement.

Figure 2 is an edge view thereof.

Figure 3 is a greatly enlarged sectional view approximately on the line 3—3 of Figure 1.

Figure 4:
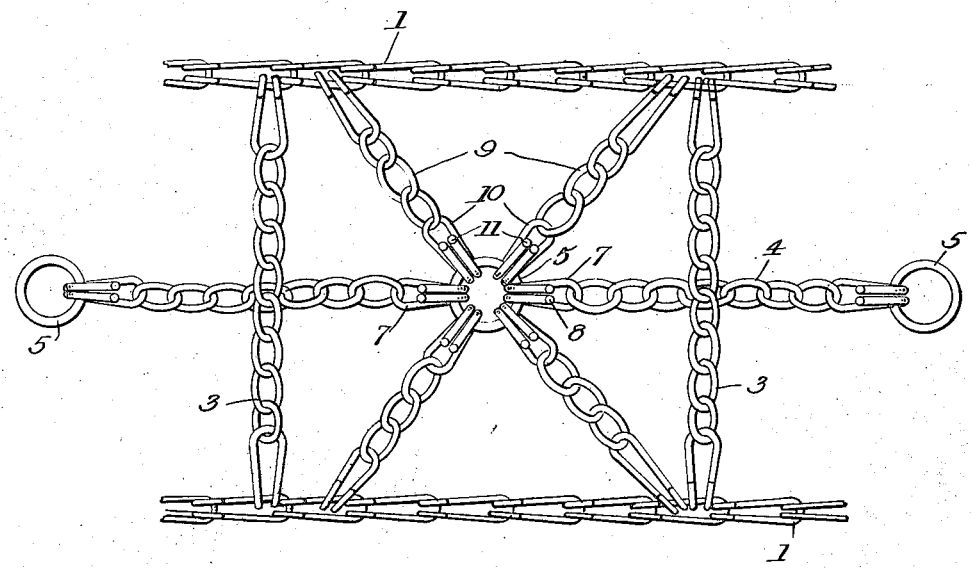
Figure 4 is a detail plan view showing the manner in which the longitudinal and angular side chains are connected by the ring and also showing the calks formed on the ends of the said chains.

The side chains 1 are arranged circumferentially around the sides of the pneumatic tired wheel 2 and have their ends connected in the usual manner. The side chains 1 are constructed of comparatively light metal.

The side chains, when the improvement is applied to the rear wheels of an automobile or to heavy constructions of machines whose tires are subjected to heavy and great wear, have connected thereto, at equi-distantly spaced intervals, transverse or tread chains 3. The transverse chains are of a heavier construction than the side chains and are arranged over the central circumferential tread chain 4 that constitutes one of the important elements of the improvement. The ends of the tread chains are connected to the side chains, when the device is arranged on the tire. The central circumferential tread chain 4 does not comprise a continuous member, but is constructed of sections, each of said sections having its ends terminating approximately centrally between the spaced pairs of transverse chains 3. The end links of these sections are bent upon themselves around metallic rings 5. The links which are connected to the rings are indicated for distinction by the numeral 7, and the ends thereof which are rounded over the rings, are brought into contact with the bodies of the said links on the outer faces thereof, and are from thence projected outwardly, as at 8 to provide calks.

To the links of the side chains 1, inward of the respective pairs of spaced transverse tread chains 3, there are secured the outer end links of angularly disposed tread chains 9. The inner links of these angle tread chains 9 are indicated, for distinction by the numeral 10, and the cooperating pairs of the said angle tread chains have their links 10 bent or rounded over the side portions of the respective rings 5. These rounded portions of the links 10 are further brought into contact with the bodies of the said links, and are from thence bent outwardly upon themselves to provide calks 11.

The construction is such that six groups of calks are arranged outwardly of each of the rings. The angle tread chains 9 provide additional bearing elements for the device. The transverse chains being arranged between the angle chains also add to the traction surface afforded between the improvement and the road surface. The central circumferential chain also provides a bearing member, and the particular construction and arrangement of all the chains not only affords great life to the improvement, but is not liable to inflict injury to the tire, and positively prevents the side skidding of the wheel on which the improvement is arranged.

Figure 5:
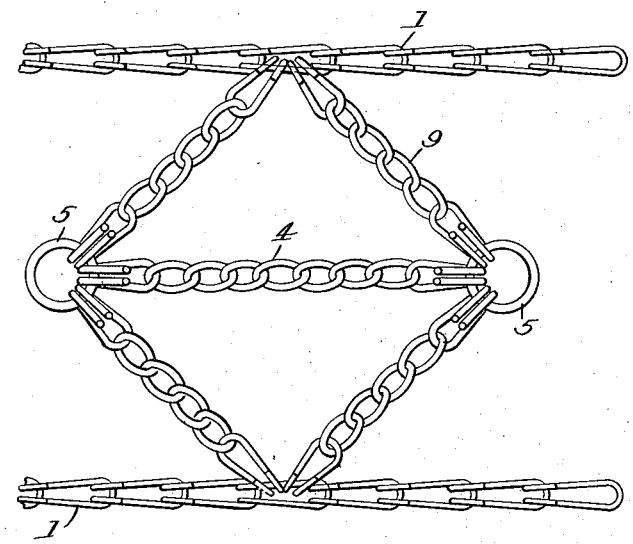
Figure 5 is a view showing a slight modification of the improvement, which may be successfully employed on the front wheels of the machine.

In Figure 5, the construction is similar to that above described, so that the reference characters indicating similar parts in the other views may be understood as equally applicable to the parts disclosed in the said figure. In this figure, however, the transverse tread chains 3 are omitted.

Having described the invention, I claim:—

In an anti-skid chain for pneumatic tires, side chains, a circumferential tread chain around the tire disposed centrally between the side chains, said central tread chain being constructed of sections, rings at the confronting ends of the sections, and the end links of the said sections being bent around the rings and projected outwardly to provide calks, angularly arranged pairs of cross chains having their outer links connected to the side chains and their inner links bent around the respective rings and outturned to provide calks, and cross chains overlying the central tread chain and disposed centrally between the opposed pairs of angularly arranged cross chains.

In testimony whereof I affix my signature.

HARRY SMITH.